United States Patent [19]
Grier

[11] 3,766,843
[45] Oct. 23, 1973

[54] ADJUSTABLY POSITIONABLE DEFLECTOR FOR VENTED AIRSTREAM

[76] Inventor: Maurice R. Grier, 1122 S. 99th St., Omaha, Nebr. 68124

[22] Filed: June 19, 1972

[21] Appl. No.: 264,140

[52] U.S. Cl..................... 98/2 R, 98/40 V, 239/511
[51] Int. Cl............................................. B60h 1/24
[58] Field of Search................. 98/2.05, 2.09, 2.16, 98/2.19, 40, 40 E, 40 V, 40 VM, 108; 239/323, 512, 511, 510

[56] References Cited
UNITED STATES PATENTS

| 2,539,976 | 1/1951 | Samson | 239/511 |
| 1,663,500 | 3/1928 | Kroh | 98/2.09 |
| 1,980,039 | 11/1934 | Crowell | 98/2.19 |
| 2,477,519 | 7/1949 | Kirby | 239/511 |

Primary Examiner—Meyer Perlin
Attorney—George R. Nimmer

[57] ABSTRACT

For the environment comprising a duct or conduit for a pressurized airstream, there is provided an adjustably positionable deflector positioned forwardly downstream of the outlet vent for re-directing the flowing air along a selected deflected-path. The deflector, which is especially desireable for use at an automobile dashboard panel, and adjacent to the air-conditioning vent, comprises an elongate baffle positioned forwardly of the duct vent and which is capable of re-directing the airstream, a foot member attachable to the dashboard panel remote of the vent, and an intervening elongate arm that is preferably manually stably deformable. The baffle, which is of generally elongate tubular form with two closeable ends and a generously longitudinally slotted sidewall, is desireably revolvable about the baffle-axis whereby the air-stream deflected-path is of increased selectivity.

11 Claims, 3 Drawing Figures

PATENTED OCT 23 1973 3,766,843
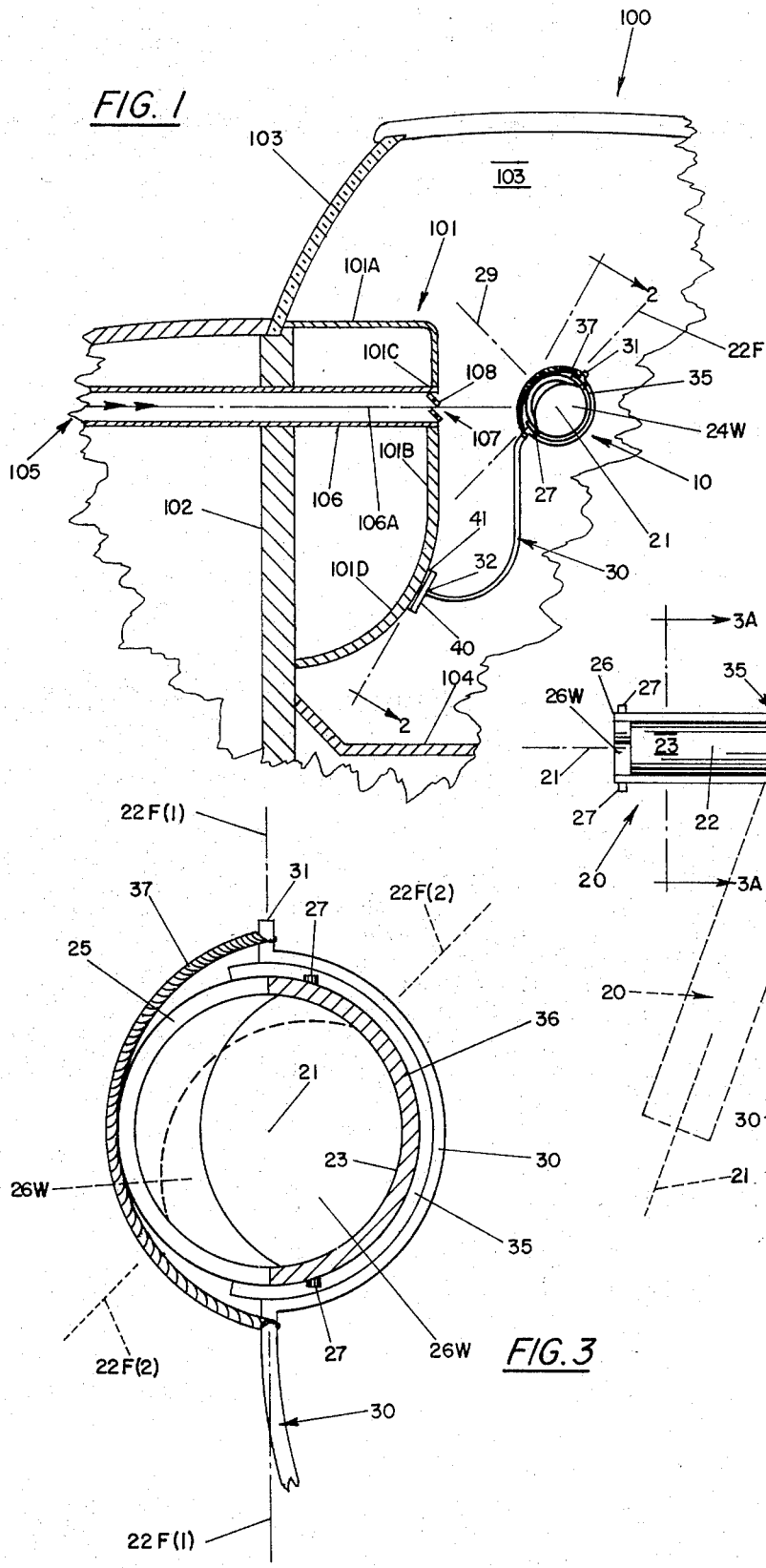
FIG. 1
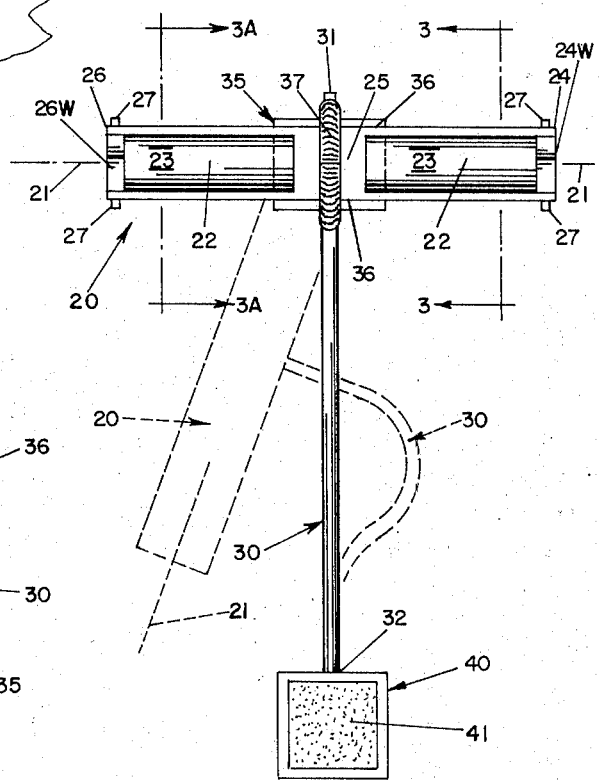
FIG. 2
FIG. 3

ADJUSTABLY POSITIONABLE DEFLECTOR FOR VENTED AIRSTREAM

Ducts and conduits are employed for conveying pressurized temperature-controlled airstreams into weather-sheltered "indoors" areas (such as commercial buildings, dwelling homes, automobiles, etc.) whereby the occupants might enjoy moderate temperature conditions as compared to the "outdoors" temperature. For relatively frigid weather conditions heated air is appropriately conveyed into the shelter, whereas for outdoors temperatures exceeding about 80°F. a cooled or refrigerated pressurized airstream is instead employed. Ducts and conduits necessarily include an outlet vent located within the shelter, and are usually located immediately adjacent to a wall, floor, automobile dashboard, or other structural panel for the shelter. Customarily, the duct forward terminal portion (i.e., that portion at the duct outlet vent) extends along a lineal duct-axis and passes through and is supported at a panel opening. Thus, the vented pressurized airstream initially (i.e., before it has become fully mixed with the indoors air) surges forwardly along the duct-axis thereby providing discomfort to occupants located immediately adjacent to the duct outlet vent. The discomfort is especially noticeable to occupants (and especially for automobile occupants) who are seated near the outlet vent for pressurized airstreams. For example, it can be a disagreeable experience for front seat occupants of automobiles to have their anatomy subjected to high-pressure dense refrigerated airstreams. Oftentimes the duct outlet vent is provided with ostensibly adjustable vanes or louvers, but they generally prove to be inadequate to protect occupants from inimical airstream drafts, this shortcoming being especially noticeable for vented cold airstreams in automobiles and elsewhere.

It is accordingly the general object of the present invention to provide a deflector that might be utilized within a shelter to re-direct the vented airstream along a linear deflected-path that is selectively non-parallel to the duct-axis thereby protecting occupants and temperature-sensitive objects located near the duct outlet vent from uncomfortable and inimical temperature levels.

It is another object of the present invention to provide an adjustably positionable deflector for vented airstreams that might be readily attached to and controllably employed as an addendum to various encountered structural environments comprising duct outlet vents, and without necessitating environmental structural modifications.

It is a further object to provide an adjustably positionable deflector for vented airstreams that has particular utility within the operator's compartment of an automobile adjacent to the dash-board panel duct outlet vent whereby vented pressurized refrigerated airstreams might be utilized more efficaceously and without discomfort to the occupant.

It is yet another object to provide an airstream deflector adapted to be employed at a contimuum of selectable positions forwardly downstream of the duct outlet vent whereby the operator might establish for himself a desireable deflected-path for the vented airstream.

With the above and other objects and advantages in view, which will become more apparent as this description proceeds, the adjustably positionable deflector for vented airstreams generally comprises an elongate generally tubular baffle extending along a baffle-axis, the tubular baffle sidewall being longitudinally slotted and defining therealong an imaginary focal-plane whereby the vented airstream passes through said focal-plane to impinge upon the baffle linearly generated interior surface and be deflected along a deflected-path that is non-parallel to the duct-axis, a foot member attached to the panel and located remote from the duct opening thereof, an elongate arm extending from the foot member to the baffle to maintain the baffle forwardly remote of the duct outlet vent, and means for selectively multidirectionally establishing the inclination of the baffle slotted portion with respect to the duct-axis.

In the drawing, wherein like characters refer to like parts in the several views, and in which:

FIG. 1 is a left side elevational view of a representative embodiment of the adjustably positionable airstream deflector of the present invention. The deflector is shown in operating combination with an apt environment typically comprising an auotmobile dashboard panel provided with an airstream duct, said environment being shown in sectional elevation.

FIG. 2 is an elevational view of the said representative embodiment taken in the direction 2—2 of FIG. 1.

FIG. 3 is a detail sectional elevational view taken along line 3—3 of FIG. 2, which is a substantial mirror image of a view taken along line 3A—3A of FIG. 2.

Turning initially to FIG. 1 which illustrates a typical environment comprising a panel carrying an airstream duct which immediately rearwardly of the duct outlet vent extends along a linear duct-axis and through a panel opening; the adjustably positionable deflector of the present invention includes a baffle located adjustably forwardly of the duct outlet vent whereby the vented airstream is directed along a selectable deflected-path that is non-parallel to the duct-axis. As schematically indicated in FIG. 1, an especially apt panel and airstream duct environment comprises the dashboard panel for the operator's compartment 100 of an automobile motor vehicle. For example, dashboard 101, which is customarily mounted to firewall 102 below transparent windshield 103, might comprise a horizontal upper shelf 101A, an upright portion 101B, and a sloping lower portion 101D. There is an elongate conduit or duct 105 adapted to carry therealong a pressurized airstream, such as for ventilating the automobile operator's compartment 100. Herein, duct 105 has a forward terminal portion 106 surroundably extending along a linear duct-axis 106A, which intersects dashboard portion 101B herein at panel opening 101C. The incoming pressurized airstream (indicated with double-headed arrow along duct-axis 106A) emerges through the duct forward outlet vent 107, which might be provided with pivotably supported vanes or louvers 108. As is well known in the prior art, the pivotably adjustable vanes or louvers 108 are not highly effective for ameliorating the airstream flow rate. Thus, during warm weather, relatively dense cold pressurized airstreams tend to chill the occupant's anatomical parts, depending upon the elevation of vent 107; moreover, cool air tends to collect toward floor 104 thereby also chilling the feet and legs of the vehicle occupants. However, with the deflector device (e.g., 10) of the present invention, the incoming airstream, even if relatively dense and highly pressurized, can be selectively re-directed and more generally circulated throughout the vehicle interior, and to the benefit of occupant comfort.

The adjustably positionable airstream deflector generally comprises an elongate generally tubular baffle extending longitudinally along a baffle-axis, the tube wall being slotted longitudinally to define therealong an imaginary chordal focal-plane. Thus, the pressurized airstream emerging from the duct outlet vent and proceeding along the duct-axis through the baffle slot (when the focal-plane 22F is non-parallel to the duct-axis) can impinge upon the baffle concave interior surface and be deflectably re-directed therefrom along a linear deflected-path 29 that is non-parallel to the duct-axis. There are means for positioning the baffle portion of the device remotely forwardly downstream of the duct outlet vent (107), such as through an elongate arm which is attached through a trailing foot member to the panel environment remote of its duct opening. Moreover, there are means for selectively changing the inclination of the baffle slot focal-plane with respect to the duct-axis thereby governing and establishing the airstream deflected-path (29).

Representative embodiment 10 of the adjustably positionable airstream deflector generally comprises an elongate baffle 20, an elongate arm 30, and a foot member 40 which is attached to the panel environment remote of its duct opening (e.g., 101C). Baffle 20 is of generally tubular configuration longitudinally extending along a baffle-axis 21, the inside surface 23 being linearly generated and parallel to baffle-axis 21. Herein, the curvilinear internal (23) and external surfaces of baffle 20 are respectively located constant radial distances from baffle-axis 21. For embodiment 10, the tubular baffle sidewall is longitudinally slotted (22) except at the baffle medial portion 25 which completely circularly surrounds baffle-axis 21. The imaginary focal-plane 22F lies chordally across slotted portion 22. When the baffle medial portion 25 is unslotted, two slotted wings remain including a left wing extending from baffle left-end 24 to medial portion 25 and a right wing extending from right-end 26 to medial portion 25. The baffle longitudinally slotted portion 22 is of generous width, and comprises some three-eights to five-eighths of the tubular baffle cross-sectional periphery. For example, for the generally circular tubular baffle 20, the unslotted portion comprises an arc of some 225° to 135° (and preferably a 180° semi-circle) with respect to baffle-axis 21. The left-end 24 and the right-end 26 are respectively provided with air-impervious end-walls 24W and 26W. However, end-walls 24W and 26W can each be pivotably adjusted and connected (as through pins 27) to baffle 20. Thus, if the operator wishes to divert some proportion of the air-stream from 29 and parallel to 21, he can do so.

The baffle is desireably revolvably attached to the elongate arm leading portion so that the focal-plane inclination with respect to the duct-axis can be selectively controlled and established simply by manually turning the baffle about the baffle-axis. The preferred revolvable connection comprises a seat (35) rigidly attached to the arm leading portion and located at and extending toward the arm leading end (31). Appropriate to baffle 20 having a circularly tubular medial portion 25, seat 35 has a curvilinear contour 36 contacting a major partial circumference (herein an arc of about 210°) of medial portion 25. A helical spring 37 has one end attached to the arm leading end 31 and the secured end secured to arm 30 and immediately trailing seat 35. Thus, helical spring 37 stretched in a distended C-shaped condition in combination with seat 35 together provide a revolvable connection between arm 30 and baffle 20. The stretched spring 37 tends to resiliently urge the baffle medial portion 25 against seat 35 to compensate for parts wear and temperature changes.

Elongate arm 30 nearer its trailing end 32 carries a foot member 40 which provides a means for attaching the deflector 10 to the panel environment remote of the duct opening. Herein foot member 40 is preferably attached through an adhesive layer 41 to the dashboard 101 at 101B thereby facilitating installation of deflector device 10. Device 10 until its installation might include a removably adherent protective sheet for laminar adhesive 41. As indicated in phantom line in FIG. 2, elongate arm 30 might be provided of a manually adjustably stably deformable material, which can be stably bent or twisted in various configurations. Thus, the distance between the outlet vent 107 and baffle 20, the distance between focal-plane 22F and duct-axis 106A, and the attitude of baffle 20, might each be selectively established and maintained. Accordingly, the combination of an adjustably stably deformable or distortable arm 30 and the baffle adjustably revolvable about baffle-axis 21 allows the operator to select among practically infinite possible positions for the baffle slotted portion 22-22F. For example, the focal-plane 22F inclination might be selected so that the redirected cool airstream along the linear deflected-path 29 will extend toward sun-drenched dashboard shelf 101A, or toward windshield 103, or even laterally horizontally away from duct-axis 106A. In any event, baffle 20 is adapted to protect the occupants from pressurized airstreams, to moderate the temperature of the panel environment, and to prevent premature settling of cold air at the floor 104. For the manually stably adjustable arm 30, various materials might be employed. For example, cylindrically tubular copper rod having a 3 millimeter diameter serves admirably for this purpose. In the drawing, such copper rod is provided with a resinous sheath which is adherently attached to a resinous seat 35.

From the foregoing, the construction and operation of the adjustably positionable airstream deflector will be readily understood and further explanation is believed to be unnecessary. However, since numerous modifications and equivalents will readily occur to those skilled in the art, it is not desired to limit the invention to the exact construction described herein, and accordingly, all reasonable equivalents and modifications are deemed to be included within the purview of the appended claims.

I claim:

1. In combination with the operator's compartment environment of a typical automobile motor vehicle and said environment including a dashboard panel provided with a duct outlet vent opening for the emergence of a pressurized airstream into the operator's compartment, the improvement comprising an adjustably positionable deflector for directing the vented airstream along a selectable linear deflected-path and comprising:

A. An elongate generally tubular baffle longitudinally extending along a baffle-axis and having a linearly generated interior surface said tubular baffle parallel to the baffle-axis being longitudinally slotted and defining therealong an imaginary focal-plane whereby the said vented airstream is adapted to pass through said imaginary focal-plane and impinge upon the said baffle linearly generated interior surface;
B. A foot member attached to the dashboard panel remote from the panel outlet vent opening;
C. An elongate arm extending from the foot member to the baffle to maintain said baffle forwardly remote from the duct outlet vent; and
D. Means for selectively establishing the inclination of the baffle slot focal-plane whereby the airstream deflected-path is determined.

2. The combination of claim 1 wherein the baffle interior surface is curvilinear; and wherein the elongate arm is manually stably adjustably deformable.

3. The combination of claim 2 wherein the baffle is of generally circularly cylindrical configuration with uniform wall thickness, the medial portion thereof being unslotted and substantially circularly surrounding the baffle-axis, said baffle medial portion being revolvably attached to the arm leading portion remote of the foot member thereby providing a means for establishing the inclination of the baffle slots' imaginary focal-plane.

4. The combination of claim 3 wherein there is a curvilinear seat carried by the arm leading portion, said baffle medial portion being revolvably attached to said seat.

5. The combination of claim 4 wherein the said curvilinear seat incompletely surrounds the baffle medial portion; wherein a helical spring of distended C-shaped configuration and associated with the arm resiliently urges said tubular medial portion against the curvilinear seat whereby said seat and distended spring together provide a revolvable connection between the arm and baffle.

6. The combination of claim 5 wherein the unslotted portions of the two baffle wings each provide arcuate sectors within the range of about 135° to 225°.

7. The combination of claim 6 wherein the duct is adapted to carry refrigerated cool air; and wherein the foot member is adhesively attached to the dashboard; and wherein the arm extends upwardly from the foot member to the baffle.

8. The combination of claim 1 wherein the duct is adapted to carry refrigerated cool air; and wherein the foot member is attached to the dashboard below the duct outlet vent, the elongate arm extending upwardly from the foot member to the baffle.

9. The combination of claim 8 wherein the elongate arm is manually stably adjustably deformable; wherein there is a curvilinear seat carried by the arm leading portion, the baffle medial portion being revolvably attached to said seat through a helical spring of distended C-shaped configuration that also resiliently urges the baffle against the seat; wherein the foot member carries a laminar adhesive to provide attachment of the deflector device to the dashboard; and wherein the two baffle ends carry end-walls pivotably adjustabley secured to the baffle.

10. An adjustably positionable deflector adapted for use as an accessory item adjacently the vent opening of an airstream duct passing through a broad panel, said deflector being capable of being secured to the panel and directing the vented airstream along a selectable linear deflected-path, said deflector comprising:
A. An elongate arm member having a trailing portion and a leading portion and that is manually stably adjustably deformable along the length thereof;
B. A foot member attached to the arm member trailing portion, said foot member being capable of being secured to the surrounding panel of the airstream vent opening; and
C. An elongate generally tubular baffle longitudinally extending along a baffle-axis and having a linearly generated interior surface, said tubular baffle having air-impervious end-walls and being generously longitudinally slotted to permit impingement of the emerging airstream against the baffle said interior surface, said baffle being revolvably attached to the arm member leading portion remote of the foot member.

11. The deflector of claim 10 wherein the tubular baffle is of generally circularly cylindrical configuration with uniform wall thickness whereby the baffle interior surface is curvilinear, the baffle medial portion being unslotted and substantially circularly surrounding the baffle-axis; wherein there is a curvilinear seat carried by the arm leading portion, said baffle unslotted medial portion being revolvably associated with said seat with a helical spring of distended C-shaped configuration; and wherein the foot member includes an adhesive layer for securing the deflector to said panel environment.

* * * * *